(12) United States Patent
Davidson et al.

(10) Patent No.: US 10,486,105 B2
(45) Date of Patent: Nov. 26, 2019

(54) CLEAN GAS STACK

(71) Applicant: 3 D Clean Coal Emissions Stack, LLC, Powell, OH (US)

(72) Inventors: James Gary Davidson, Buchanan, TN (US); Dave Hendrickson, Hibbing, MN (US)

(73) Assignee: 3D Clean Coal Emissions Stack, LLC, Powell, OH (US)

( * ) Notice: Subject to any disclaimer, the term of this patent is extended or adjusted under 35 U.S.C. 154(b) by 0 days.

(21) Appl. No.: 16/186,860

(22) Filed: Nov. 12, 2018

(65) Prior Publication Data

US 2019/0076783 A1    Mar. 14, 2019

Related U.S. Application Data

(63) Continuation of application No. PCT/US2017/032448, filed on May 12, 2017.
(Continued)

(51) Int. Cl.
*B01D 53/86* (2006.01)
*B01J 29/06* (2006.01)
(Continued)

(52) U.S. Cl.
CPC .......... *B01D 53/869* (2013.01); *B01D 53/26* (2013.01); *B01D 53/323* (2013.01); *B01D 53/326* (2013.01); *B01D 53/86* (2013.01); *B01D 53/864* (2013.01); *B01D 53/8609* (2013.01); *B01D 53/8628* (2013.01); *B01D 53/8659* (2013.01); *B01D 53/8665* (2013.01); *B01J 21/063* (2013.01); *B01J 29/06* (2013.01); *B01J 29/061* (2013.01); *B01J 29/072* (2013.01); *B01J 35/04* (2013.01); *B01J 35/1028* (2013.01); *B01J 37/0009* (2013.01); *B01J 37/0225* (2013.01); *B01J 37/0228* (2013.01); *B01J 37/08* (2013.01); *F23J 15/00* (2013.01); *F23J 15/02* (2013.01); *B01D 2255/2022* (2013.01); *B01D 2255/2027* (2013.01); *B01D 2255/2045* (2013.01); *B01D 2255/50* (2013.01); *B01D 2255/904* (2013.01);
(Continued)

(58) Field of Classification Search
None
See application file for complete search history.

(56) References Cited

U.S. PATENT DOCUMENTS 3,359,707 A   12/1967 Jean
3,895,094 A   7/1975 Carter et al.
(Continued)

FOREIGN PATENT DOCUMENTS

DE   44 43 301 A1   6/1996
EP   0 393 917 A2   10/1990
(Continued)

OTHER PUBLICATIONS

Aug. 10, 2017 Transmittal of ISR and Written Opinion of Int'l Searching Authority for PCT/US2017/032448.

*Primary Examiner* — Jelitza M Perez
(74) *Attorney, Agent, or Firm* — Hahn Loeser & Parks, LLP (57) ABSTRACT

A flow-through solid catalyst formed by coating a zeolite material on a metal or ceramic solid substrate. In some embodiments, the solid substrate is formed as flat plates, corrugated plates, or honeycomb blocks.

18 Claims, 7 Drawing Sheets

Related U.S. Application Data (60) Provisional application No. 62/336,640, filed on May 14, 2016.

(51) Int. Cl.
  *B01D 53/32* (2006.01)
  *F23J 15/00* (2006.01)
  *B01D 53/26* (2006.01)
  *B01J 21/06* (2006.01)
  *B01J 29/072* (2006.01)
  *B01J 35/04* (2006.01)
  *B01J 35/10* (2006.01)
  *B01J 37/00* (2006.01)
  *B01J 37/02* (2006.01)
  *B01J 37/08* (2006.01)
  *F23J 15/02* (2006.01)

(52) U.S. Cl.
  CPC .......... *B01D 2255/9202* (2013.01); *B01D 2255/9207* (2013.01); *B01D 2257/2025* (2013.01); *B01D 2257/2027* (2013.01); *B01D 2257/302* (2013.01); *B01D 2257/404* (2013.01); *B01D 2257/502* (2013.01); *B01D 2257/504* (2013.01); *B01D 2257/602* (2013.01); *B01D 2257/80* (2013.01); *B01D 2258/0283* (2013.01); *Y02E 20/326* (2013.01)

(56) References Cited

U.S. PATENT DOCUMENTS

| | | | |
|---|---|---|---|
| 4,038,050 A | 7/1977 | Lowther | |
| 4,052,337 A | 10/1977 | Nishikawa et al. | |
| 4,133,671 A | 1/1979 | Mikel | |
| 4,297,328 A | 10/1981 | Ritscher et al. | |
| 4,735,930 A | 4/1988 | Gerdes et al. | |
| 4,748,012 A | 5/1988 | Weber et al. | |
| 4,946,659 A | 8/1990 | Held et al. | |
| 5,041,270 A | 8/1991 | Fujitani et al. | |
| 5,041,272 A | 8/1991 | Tamura et al. | |
| 5,085,840 A | 2/1992 | Held et al. | |
| 5,143,707 A | 9/1992 | Beck et al. | |
| 5,160,033 A | 11/1992 | Vassilakis et al. | |
| 5,186,903 A | 2/1993 | Cornwell | |
| 5,221,520 A | 6/1993 | Cornwell | |
| 5,223,237 A | 6/1993 | Simpson et al. | |
| 5,266,543 A | 11/1993 | Matsumoto et al. | |
| 5,270,024 A | 12/1993 | Kasahara et al. | |
| 5,417,949 A | 5/1995 | McWilliams et al. | |
| 5,417,950 A | 5/1995 | Sheu et al. | |
| 5,429,842 A | 7/1995 | Appel et al. | |
| 5,482,692 A | 1/1996 | Audeh et al. | |
| 5,520,895 A | 5/1996 | Sharma et al. | |
| 5,536,483 A | 7/1996 | Descat et al. | |
| 5,589,147 A | 12/1996 | Farnos et al. | |
| 5,629,842 A | 5/1997 | Johnson et al. | |
| 5,631,818 A | 5/1997 | Johnson et al. | |
| 5,740,024 A | 4/1998 | Johnson et al. | |
| 5,776,324 A | 7/1998 | Usala | |
| 5,871,703 A | 2/1999 | Alix et al. | |
| 5,903,450 A | 5/1999 | Johnson et al. | |
| 5,920,474 A | 7/1999 | Johnson et al. | |
| 6,117,403 A | 9/2000 | Alix et al. | |
| 6,126,912 A * | 10/2000 | Bourges | B01D 53/8628 423/239.1 |
| 6,132,692 A | 10/2000 | Alix et al. | |
| 6,171,556 B1 | 1/2001 | Burk et al. | |
| 6,221,324 B1 | 4/2001 | Coq et al. | |
| 6,475,350 B2 | 11/2002 | Palekar et al. | |
| 6,605,263 B2 | 8/2003 | Alix et al. | |
| 6,638,342 B2 | 10/2003 | Gansley et al. | |
| 6,689,709 B1 | 2/2004 | Tran et al. | |
| 6,914,026 B2 | 7/2005 | Tran et al. | |
| 6,936,231 B2 | 8/2005 | Duncan et al. | |
| 6,991,771 B2 | 1/2006 | Duncan et al. | |
| 7,048,899 B2 | 5/2006 | Alix et al. | |
| 7,052,662 B2 | 5/2006 | Duncan et al. | |
| 7,118,722 B2 | 10/2006 | Tran et al. | |
| 7,399,453 B2 | 7/2008 | Kelley et al. | |
| 7,404,940 B2 | 7/2008 | Higgins et al. | |
| 7,704,475 B2 | 4/2010 | Bull et al. | |
| 7,968,068 B2 | 6/2011 | Bull et al. | |
| 8,071,043 B2 | 12/2011 | Como et al. | |
| 8,092,270 B2 | 1/2012 | Sterndale et al. | |
| 8,821,818 B1 | 9/2014 | Davidson | |
| 9,067,839 B2 | 6/2015 | Davidson | |
| 9,737,849 B2 * | 8/2017 | Davidson | C05D 9/00 |
| 9,919,269 B2 * | 3/2018 | Davidson | B01D 53/8609 |
| 2001/0001435 A1 | 5/2001 | Palekar et al. | |
| 2001/0014304 A1 | 8/2001 | Satokawa et al. | |
| 2004/0053773 A1 | 3/2004 | Sarkar et al. | |
| 2004/0109805 A1 | 6/2004 | Schweter et al. | |
| 2004/0219084 A1 | 11/2004 | Hall | |
| 2005/0178303 A1 | 8/2005 | Higgins | |
| 2005/0214181 A1 | 9/2005 | Kaneko | |
| 2005/0260114 A1 | 11/2005 | Higgins et al. | |
| 2007/0157690 A1 | 7/2007 | Chen et al. | |
| 2008/0044331 A1 | 2/2008 | Schweter et al. | |
| 2008/0229733 A1 * | 9/2008 | Newburry | F01N 3/2839 60/299 |
| 2010/0083828 A1 | 4/2010 | Duncan et al. | |
| 2010/0089110 A1 | 4/2010 | Duncan et al. | |
| 2010/0319542 A1 | 12/2010 | Alix et al. | |
| 2011/0052453 A1 | 3/2011 | McLarnon et al. | |
| 2011/0110841 A1 | 5/2011 | Mahoney et al. | |
| 2011/0125326 A1 | 5/2011 | Bosco et al. | |
| 2013/0269525 A1 | 10/2013 | Alix et al. | |
| 2014/0260472 A1 * | 9/2014 | Davidson | C05D 9/00 71/58 |
| 2015/0093312 A1 * | 4/2015 | Yin | B01J 23/40 423/213.5 |
| 2015/0258493 A1 * | 9/2015 | Davidson | C05D 9/00 422/171 |
| 2016/0199780 A1 * | 7/2016 | Davidson | B01D 53/261 71/58 |

FOREIGN PATENT DOCUMENTS

| | | |
|---|---|---|
| GB | 2 051 030 A | 1/1981 |
| WO | WO 2004/002611 A1 | 1/2004 |
| WO | WO 2004/047960 A1 | 6/2004 |

\* cited by examiner

CLEAN GAS STACK

This application is a continuation of international application no. PCT/US2017/032448, filed 12 May 2017, which claims the benefit of the filing date of Ser. No. 62/336,640, filed 14 May 2016 and titled Clean Gas Stack.

BACKGROUND AND SUMMARY

Inventions relating to cleaning of stack gases from any fossil fuel source, such as those from coal-fired power plants, from natural or propane burning heating plants, or from cement kilns, were disclosed in Ser. No. 15/067,569 and its ancestor applications. The stack gases exhausted from such facilities are controlled by environmental regulations. Such regulations require abatement of carbon monoxide (CO), carbon dioxide ($CO_2$), nitrogen oxide (NOx), sulfur oxide (SOx) as well as halogens (such as chloride and fluorides) and trace metals, particularly mercury, lead, and zinc. The present application discloses and claims flow-through solid catalysts formed by coating the zeolite material on a metal or ceramic solid substrate. In some embodiments, the solid substrate is formed as flat plates, corrugated plates, or honeycomb blocks.

Various methods and apparatuses have been proposed for abating these pollutants in stack gases. In particular, a variety of methods have been proposed for reducing pollutants released from coal-fired stack gas. One method of cleaning coal-fired stack gas is the use of scrubbers that inject a liquid or slurry into a gas stream that washes various pollutants, such as with acidic compounds, from the stack gas stream. Another type of cleaning is the use of an exhaust burner that combusts volatile materials and other combustible compounds reducing pollution in the stack gas.

Specifically, it has been proposed that the stack gases be mixed with ammonia or urea and then passed through a catalyst in which the ammonia or urea reacts selectively with the nitrous oxides to form nitrogen gas in water vapor, or combustion of a sulfur-containing fossil fuel in the presence of a calcium carbonate or magnesium carbonate to form calcium sulfate or magnesium sulfate. See U.S. Pat. Nos. 8,181,451; 6,706,246; 5,525,317; 5,237,939; 4,185,080; and 4,051,225. It has also been proposed to reduce nitrogen in stack gas by passing the stack gas through a heat exchange having a SCR catalyst. See U.S. Pat. No. 5,918,555. Reduction of sulfur oxide content in stack gases has been proposed involving catalyzed oxidation to sulfur trioxide in the presence of an absorbent or combusting sulfur-containing fuel in a combustion zone charged with a slurry in sulfuric acid solution. See U.S. Pat. Nos. 5,540,755; 4,649,034; 4,284,015; and 4,185,080. Catalytically converting unburned hydrocarbons and carbon monoxide to carbon dioxide and reducing nitrogen oxides to nitrogen subsequent to the combustion of fossil fuels, while absorbing sulfur oxide has been proposed, where the catalytic material is physically combined into a dry powder of an adsorbent matrix selected from calcium aluminate, calcium aluminate cement, barium titanate, and calcium titanate. See U.S. Pat. No. 4,483,259. It has also been proposed to pass the stack gases through a solid catalyst of a combination of active metals on the surface that is capable of reducing or converting sulfur oxides, carbon monoxide and hydrocarbons to inert compounds such as carbon dioxide, water and nitrogen. See U.S. Pat. No. 7,399,458. Levels of mercury in stack gases from coal combustion have also been reduced by introducing a sorbent composition into the gas stream in a zone where temperature is greater than 500° C., where the sorbent composition comprises an effective amount of nitrate salt and/or a nitrite salt. See U.S. Pat. Nos. 7,468,170 and 7,731,781.

Other types of cleaning stack gas have also been proposed and will be known to those having skill in the art. These previous proposals have a number of drawbacks. Many require addition of another gas or liquid such as ammonia, sulfuric acid, or the presence of an active metal catalyst.

One particular problem unresolved by current technology is carbon gaseous pollutants that cannot be reduced by scrubbing or combustion. It has been proposed to capture the carbon in the form of carbon dioxide, compress the carbon dioxide, and store it in a geological formation. Zeolite has been proposed among other materials to absorb carbon dioxide, and after sequestering the carbon dioxide then to be able to regenerate the zeolite material. See "*Carbon Dioxide Capture Using a Zeolite Molecular Sieve Sampling System for Isotopic Studies ($^{13}C$ and $^{14}C$) of Respiration*", Radiocarbon, 47, 441-451 (2005); "*Absorbent Materials for Carbon Dioxide Capture from Large Anthropogenic Point Sources*", ChemSusChem 2009, 2, 796-854; "*NIST Provides Octagonal Window of Opportunity for Carbon Capture*", NIST Techbeat, Feb. 7, 2012. These uses of zeolite generally involved large particle sizes of zeolite; for example, between $\frac{1}{16}$ and $\frac{1}{8}$ inch in size under conditions to provide for adsorption of carbon dioxide and later regeneration. These methods of absorbing carbon dioxide highlight the continuing problem of disposing of sequestered carbon dioxide.

There is therefore still a need for a method and apparatus to effectively remove carbon monoxide, carbon dioxide, nitrogen oxides, sulfur oxides and trace metals, such as mercury, from stack gases without consuming expensive catalysts, without injecting additional gases, liquids and/or solids into the stack gas, and without creating waste products that themselves present problems and costs in disposal. This is of particular concern in cleaning of stack gases from coal power plants because of the release of volatiles such as coal tar and other active pollutants along with carbon dioxide in the stack gas.

An added compounding problem is the water vapor content of the stack gas reaching the cleaning system. The moisture content of typical stack gas exited from a baghouse and directed to a stack gas cleaning system is typically 12% to 14% water, or more, and the difficulty of stack gas cleaning with the available water vapor content causes the catalyst to be swamped and inoperative for commercial applications. The catalyst is inoperative to reduce carbon monoxide, carbon dioxide, nitrogen oxides and sulfur oxides to produce oxygen and residuals. Therefore there is still a need for an effective and commercially viable method of reducing the water vapor content of stack gas before reaching the catalyst so that the catalyst can effectively reduce carbon monoxide, carbon dioxide, nitrous oxides and sulfur oxides to oxygen and residuals.

Presently disclosed is an apparatus for drying and cleaning stack gases comprising: (a) a first flow-through solid catalyst of natural calcium zeolite with a porosity of a total surface area of not greater than 1200 $m^2/g$ adapted to reduce carbon oxides present in an exhaust stack; (b) a second flow-through solid catalyst of a blend of natural sodium zeolite and natural calcium zeolite of a porosity with a total surface area of not greater than 1200 $m^2/g$ adapted to reduce sulfur oxides present in the exhaust stack downstream of the first solid catalyst; (c) a third flow-through solid catalyst of natural calcium zeolite with a porosity of a total surface area not greater than 1200 $m^2/g$ adapted to reduce nitrogen oxides present in the exhaust stack downstream of the second solid catalyst; (d) a pair of electrodes adapted to be positioned inline in the gas flow upstream of the first flow-through solid catalyst and insulated from containment of the gas flow, such as a pipe, and applying D.C. voltage between the electrodes to ionize water vapor without creating substantial amounts of hydrogen gas and reduce moisture content of the gas flow through the flow-through solid catalyst; (d) an exhaust stack adapted to provide a gas flow, selected from the group consisting of volatiles from combustion of coal or from combustion of natural gas or from a cement kiln, sequentially past the pair of electrodes and through the first flow-through solid catalyst, the second flow-through solid catalyst, and the third flow-through solid catalyst, each solid catalyst collecting residuals, and providing stack gases exiting the third flow-through solid catalyst with at least 70% reduction in sulfur oxides, nitrogen oxides, and carbon oxides; and (e) optionally the first flow-through solid catalyst, the flow-through solid catalyst, and the third flow-through solid catalyst each adapted to be periodically purged with nitrogen to remove solids and/or liquids collected in the first flow-through solid catalyst, the second flow-through solid catalyst, and/or the third flow-through solid catalyst so each flow-through solid catalyst can be prepared for reuse. Note the first flow-through solid catalyst, the second flow-through solid catalyst, and the third flow-through solid catalyst may include other zeolites particle sizes as explained in more detail below.

Here as elsewhere in this application "flow-through solid catalyst" means a substrate on which the described zeolite solid catalyst is applied to enable a desired gas stream to flow through. The substrate may be a plate type, honeycomb or corrugated as described in more detail below, although the plate type is preferred. The substrate is metal (e.g. stainless steel or copper) or ceramic. The zeolite solid catalyst is generally coated on the substrate mechanically such as by dip coating or plasma arc. A binder and surfactant may also be used to a provide better adherence of the zeolite solid catalyst to the substrate.

The electrodes may be positioned in the gas flow downstream of a baghouse. The D.C. voltage applied between the electrodes may be less than 34 volts to be effective to ionize the water vapor as previously described, but be sufficiently low to avoid the presence of hydrogen gas in substantial quantities downstream of the solid catalysts in the stack gas stream as described. The electrodes in the gas flow upstream of the first flow-through solid catalyst insulated from containment of the gas flow may apply such voltage to ionize water vapor in the gas flow and reduce moisture content of the gas flow in the first flow-through solid catalyst to be below 8% or 5% or to provide a lower or different moisture content as desired.

The exhaust stack may be adapted to exit gases from the third flow-through solid catalyst with at least 80% or 90% reduction in carbon oxides, sulfur oxides, and nitrogen oxides compared to the stack gases after reaching the electrodes.

The apparatus in addition may have a venturi positioned in the gas flow downstream of the third flow-through solid catalyst to stabilize gas flow through the solid catalysts. The apparatus may also include stabilizing veins to improve laminar flow of the stack gases through the solid catalysts. Stabilizing veins may improve efficiency of separation of pollutants from the stack gases. Stabilizing veins may be positioned upstream or downstream of the electrodes in the gas stream, but may be more advantageously positioned downstream of the electrodes before the gas stream enters the flow-through solid catalyst.

The blend of natural sodium zeolite and natural calcium zeolite in the second flow-through solid catalyst may be between 25% and 75%.

The first flow-through solid catalyst, the second flow-through solid catalyst, and the third flow-through solid catalyst may also each have a porosity of total surface area not greater than 800 $m^2/g$. Also a fourth flow-through solid catalyst of calcium zeolite may also be provided in the gas flow after passing the pair of electrodes and before the first flow-through solid catalyst with a porosity of total surface area not greater than 1200 $m^2/g$, or not greater than 800 $m^2/g$, adapted to collect bauxite compounds before passage through the first flow-through solid catalyst. The fourth flow-through solid catalyst also may be adapted to be periodically purged with nitrogen. Where a fourth flow-through solid catalyst is provided, exhaust stack gases may exit from the third flow-through solid catalyst with at least 70% or 90% reduction in bauxite compounds, carbon oxides, sulfur oxides, nitrogen oxides, and mercury oxides compared to the stack gases delivered to the pair of electrodes.

The apparatus may comprise at least two series of sequential gas flows both through a pair of electrodes, a first flow-through solid catalyst, a second flow-through solid catalyst, and a third flow-through solid catalyst, provided in parallel, so stack gases can be cleaned through one of the series of solid catalysts while the other series of solid catalysts can be purged.

Also disclosed is a method of drying and cleaning stack gases comprising the steps of:

(a) passing a contained stack gas flow, selected from the group consisting of volatiles from combustion of coal or from combustion of natural gas or from a cement kiln, through a pair of electrodes adapted to be positioned inline in the gas flow and applying a D.C. voltage between the electrodes to reduce moisture content of the gas flow through the flow-through solid catalysts without creating substantial amounts of hydrogen gas;

(b) passing stack gas flow from the electrodes through a first flow-through solid catalyst of calcium zeolite comprising natural zeolite particles of a majority between 44 µm and 64 µm in size at a temperature above the dew point between 125° F. and 500° F. and a pressure between 3 psi and 200 psi adapted to reduce carbon oxides in the stack gas flow;

(c) passing the stack gas flow from the first flow-through solid catalyst through a second flow-through solid catalyst of a blend between 25% and 75% of sodium zeolite and calcium zeolite comprising natural sodium and with the calcium zeolite particles comprised of a majority between 65 µm and 125 µm in size at a temperature above the dew point between 125° F. and 500° F. and a pressure between 3 psi and 200 psi adapted to reduce sulfur oxides in the stack gas flow;

(d) passing the stack gas flow from the second flow-through solid catalyst through a third flow-through solid catalyst of calcium zeolite comprising natural zeolite particles of a majority between 78 µm and 204 µm at a temperature above the dew point between 125° F. and 500° F. and a pressure between 3 psi and 200 psi adapted to reduce nitrogen oxides in the stack gas flow; and (e) operating the stack gas flow sequentially past the pair of electrodes and through the first solid catalyst, the second solid catalyst, and the third solid catalyst to provide at least 70% reduction in sulfur oxides, nitrogen oxides and carbon oxide in the stack gas flow.

In the method, the voltage between the electrodes may be below 34 volts, and the gas flow sequentially circulated past the pair of electrodes and through the first flow-through solid catalyst, the second flow-through solid catalyst, and the third flow-through solid catalyst also may remove from the gas flow at least 50% or 70% of mercury in all forms. The pair of electrodes in step (a) may also be positioned in the gas flow downstream of a baghouse. The method of drying and cleaning stack gas may also have the pair of electrodes in the gas flow upstream of the first flow-through solid catalyst insulated from containment of the gas flow with D.C. voltage applied to the electrodes to ionize water vapor in the gas flow and reduce moisture content of the gas flow in the first flow-through solid catalyst, preferably to below 8% or 5% or a lower or different moisture content as desired.

Alternatively, a method of drying and cleaning stack gases is disclosed comprising the steps of:
(a) passing a contained stack gas flow selected from the group consisting of volatiles from combustion of coal or from combustion of natural gas or from a cement kiln by a pair of electrodes positioned inline in the gas flow and applying a D.C. voltage between the electrodes to ionize water vapor in the gas flow without creating substantial amounts of hydrogen gas and reduce moisture content of the gas flow in the flow-through solid catalyst in the gas flow before reaching the pair of electrodes;
(b) passing stack gas flow from the pair of electrodes through a first flow-through solid catalyst comprised of calcium zeolite of natural zeolite particles of a majority between 44 µm and 64 µm in size at a temperature above the dew point between 125° F. and 500° F. and a pressure between 3 psi and 200 psi adapted to reduce carbon oxides in the stack gases;
(c) passing the stack gas flow from the first flow-through solid catalyst through a second flow-through solid catalyst comprised of a blend between 25% and 75% of sodium zeolite and calcium zeolite of natural sodium and calcium zeolite particles of a majority between 65 µm and 125 µm in size at a temperature above the dew point between 125° F. and 500° F. and a pressure between 3 psi and 200 psi adapted to reduce sulfur oxides in the stack gases;
(d) passing the stack gas flow from the second flow-through solid catalyst through a third flow-through solid catalyst comprised of calcium zeolite of natural zeolite particles of a majority between 78 µm and 204 µm at a temperature above the dew point between 125° F. and 500° F. and a pressure between 3 psi and 200 psi adapted to reduce nitrogen oxides in the stack gases and providing a stack gas flow exiting the third solid catalyst with at least 70% reduction in sulfur oxides, nitrogen oxides and carbon oxide; and
(e) optionally periodically purging residuals from the first solid catalyst, the second solid catalyst, and the third solid catalyst by intermittently passing liquid or gaseous nitrogen through the solid catalysts to remove solids and liquids collected from the stack gas flow by the solid catalysts.

In the alternative method of drying and cleaning stack gas described above, the voltages between the electrodes may be less than 34 volts, and the stack gas may have the flow sequentially circulated past the same or a different pair of electrodes and through one of the parallel series of a first flow-through solid catalyst, a second flow-through solid catalyst, and a third flow-through solid catalyst so that one series of flow-through solid catalysts may be cleaned for use while another series of flow-through solid catalysts is used in cleaning stack gas.

The method also may remove from the gas flow at least 50% of mercury or at least 70% of mercury in all forms.

The electrodes in step (a) of the alternative method of cleaning and drying may be positioned in the gas flow downstream of a baghouse. The alternative method of drying and cleaning stack gas may also have the additional step of passing the gas flow through a venture positioned downstream of the third flow-through solid catalyst to stabilize the gas flow through the solid catalysts.

The alternative method of drying and cleaning stack gas may also comprise a fourth flow-through solid catalyst of calcium zeolite comprising natural zeolite particles between 44 µm and 64 µm in size positioned in the stack gas flow after the pair of electrodes and before the first solid catalyst with an electrical charge on said fourth flow-through solid catalyst to separately collect bauxite compounds from the stack gas flow before passing through the first solid catalyst. In this embodiment, the stack gas exiting a stack from the third solid catalyst may have at least 70% or 90% reduction in bauxite compounds, carbon oxides, sulfur oxides, nitrogen oxides, and mercury oxide compared to the stack gas flow delivered through the stack.

The alternative method of drying and cleaning stack gas may have the pair of electrodes positioned in the gas flow upstream of the first flow-through solid catalyst insulated from containment of the gas flow with applied D.C. voltage to ionize water vapor without creating substantial amounts of hydrogen gas in the gas flow, and reduce moisture content of the gas flow through the flow-through solid catalysts to below, for example, 8% or 5% or a lower or different moisture content as desired.

The alternative method of drying and cleaning stack gas may comprise the additional step of passing the gas flow through a venturi positioned downstream of the third flow-through solid catalyst to stabilize the gas flow flow-through solid catalysts.

The alternative method of drying and cleaning stack gas may have at least two series of stack gas flows are provided in parallel to provide for the gas flow to passed a pair of electrodes inline and through a first solid catalyst, a second solid catalyst, and a third solid catalyst to enable at least one solid catalyst in series of solid catalysts can be purged while the stack gas flow continues to be dried and cleaned through a series of solid catalysts and optionally another pair of electrodes.

A second alternative method of drying and cleaning stack gases is disclosed comprising the steps of:
(a) passing a stack gas flow of less than 7% oxygen selected from the group consisting of volatiles from combustion of coal or from combustion of natural gas or from a cement kiln by a pair of electrodes positioned generally inline in the gas flow and to ionize water vapor without creating substantial amounts of hydrogen gas and reduce moisture content of the gas flow through the flow-through solid catalyst as described below;
(b) passing the gas flow from the pair of electrodes through a first flow-through solid catalyst comprised of calcium zeolite of natural zeolite particles at a temperature above the dew point between 125° F. and 500° F. and a pressure between 3 psi and 200 psi adapted to reduce carbon oxides from the stack gases and increase oxygen levels in the stack gases;

(c) passing the gas flow from the first flow-through solid catalyst through a second flow-through solid catalyst comprised of a blend between 25% and 75% of sodium zeolite and calcium zeolite of natural sodium and calcium zeolite particles at a temperature above the dew point between 125° F. and 500° F. and a pressure between 3 psi and 200 psi adapted to reduce sulfur oxides from the stack gases and increase oxygen levels in the stack gases;

(d) passing the gas flow from the second flow-through solid catalyst through a third flow-through solid catalyst comprised of calcium zeolite of natural zeolite particles at a temperature above the dew point between 125° F. and 500° F. and a pressure between 3 psi and 200 psi adapted to reduce nitrogen oxides in the stack gases and increase oxygen levels in the stack gas and providing gas flow exiting the third flow-through solid catalyst with at least 70% reduction in carbon oxides, sulfur oxides, and nitrogen oxides and providing at least a 15% increase in oxygen content.

The electrodes in step (a) may be positioned in the gas flow downstream of a baghouse and the voltage between the electrodes may be less than 34 volts. Also the second alternative method of drying and cleaning stack gas may have the pair of electrodes in the gas flow upstream of the first flow-through solid catalyst insulated from containment of the gas flow with an applied voltage to the electrodes to ionize water vapor in the gas flow and reduce moisture content of the gas flow in the first flow-through solid catalyst.

The second alternative method of drying and cleaning stack gas may have the stack gas flow sequentially circulated past the pair of electrodes and through the first flow-through solid catalyst, the second flow-through solid catalyst, and the third flow-through solid catalyst also removes from the gas flow at least 50% or at least 70% of mercury in all forms.

The second alternative method of drying and cleaning stack gas may comprise the additional step of passing the gas flow through a venturi positioned downstream of the third flow-through solid catalyst to stabilize the gas flow through flow-through the solid catalysts.

The second alternative method of drying and cleaning stack gas may comprise in addition a fourth flow-through solid catalyst of calcium zeolite comprising natural zeolite particles between 44 μm and 64 μm in size positioned in the stack gas flow after the pair of electrodes and before the first catalytic solid catalyst with an electrical charge on said fourth flow-through solid catalyst to separately collect bauxite compounds from the stack gas flow before passing through the first solid catalyst. In this alternative method of drying and cleaning stack gas may have the stack gas exiting a stack from the third flow-through solid catalyst may have at least 70% or at least 90% reduction in bauxite compounds, carbon oxides, sulfur oxides, nitrogen oxides, and mercury oxide compared to the stack gas flow delivered through the stack.

The second alternative method of drying and cleaning stack gas may have at least two series of stack gas flows provided in parallel to pass the same or a different pair of electrodes inline to dry the stack gas by applying a voltage between the electrodes to ionize the water vapor without creating substantial amounts of hydrogen gas and through a series of a first flow-through solid catalyst, a second flow-through solid catalyst, and a third flow-through solid catalyst so that one stack gas flow can be dried and cleaned by the method described, while an alternative series of a first flow-through solid catalyst, a second flow-through solid catalyst, and a third flow-through solid catalyst may be purged for reuse.

A third alternative method of drying and cleaning stack gases is disclosed comprising the steps of:

(a) passing a stack gas flow selected from the group consisting of volatiles from combustion of coal or from combustion of natural gas or from a cement kiln by at least two electrodes positioned generally inline in the gas flow and applying a D.C. voltage between the electrodes sufficient to ionize the water vapor in the stack gas flow without creating substantial amounts of hydrogen gas and reduce moisture content of the gas flow through the flow-through solid catalysts described below;

(b) passing the gas flow from the pair of electrodes through a first flow-through solid catalyst comprised of calcium zeolite with a porosity of a total surface area not greater than 1200 $m^2/g$ to reduce carbon oxides from the stack gases and increase oxygen levels in the stack gas;

(c) passing the gas flow from the first flow-through solid catalyst through a second flow-through solid catalyst comprised of a blend between 25% and 75% of sodium zeolite and calcium zeolite with a porosity of a total surface area not greater than 1200 $m^2/g$ to reduce sulfur oxides from the gas flow and increase oxygen levels in the gas flow;

(d) passing the gas flow from the second flow-through solid catalyst through a third flow-through solid catalyst comprised of calcium zeolite comprising natural zeolite particles with a porosity of a total surface area not greater than 1200 $m^2/g$ to reduce nitrogen oxides and providing gas exiting the third solid catalyst with at least 70% reduction in sulfur oxides, nitrogen oxides and carbon oxides and at least a 15% increase in oxygen content.

The electrodes in step (a) of this third alternative method may be positioned in the gas flow downstream of a baghouse. This third alternative method of drying and cleaning stack gas may also provide the pair of electrodes in the gas flow upstream of the first flow-through solid catalyst and insulated from containment of the gas flow, and may apply D.C. voltage less than 34 volts to ionize water vapor in the gas flow and reduce moisture content of the gas flow in the first flow-through solid catalyst, preferably to below 8% or 5% or a lower or different moisture content as desired.

Note that in the method and alternative methods described above, the first flow-through solid catalyst, the second flow-through solid catalyst, and the third flow-through solid catalyst may include other sizes of particles of zeolite as explained in more detail below.

In the third alternative method of drying and cleaning stack gas, an additional fourth flow-through solid catalyst of calcium zeolite comprising natural zeolite particles with a porosity of a total surface area not greater than 1200 $m^2/g$ may be positioned in the stack gas flow after the pair of electrodes and before the first flow-through solid catalyst with an electrical charge to separately collect bauxite compounds from the stack gas flow before passing through the flow-through first solid catalyst. This method of drying and cleaning stack gas may have the stack gas exiting a stack from the third flow-through solid catalyst with at least 70% or at least 90% reduction in bauxite compounds, carbon oxides, sulfur oxides, nitrogen oxides, and mercury oxide compared to the stack gas flow delivered to the stack.

This third alternative method of drying and cleaning stack gas may have at least two series of stack gas flows provided in parallel to pass the same or a different pair of electrodes positioned inline to ionize the water vapor in the stack gas without creating substantial amounts of hydrogen gas and through a series first flow-through solid catalyst, a second flow-through solid catalyst, and a third flow-through solid catalyst so that one solid catalyst of stack gas flow can be dried and cleaned by the method described while another series of flow-through solid catalysts are purged for use.

This third alternative method of drying and cleaning stack gas may also comprise in addition a fourth catalytic flow-through solid catalyst comprised of calcium zeolite of natural zeolite particles between 44 µm and 64 µm in size positioned in the stack gas flow after the pair of electrodes and before the first flow-through solid catalyst, with an electrical charge on said fourth catalytic flow-through solid catalyst, to separately collect bauxite compounds from the stack gas flow before passing through the first flow-through solid catalyst. In this alternative method of drying and cleaning stack gas, the stack gas exiting a stack from the third flow-through solid catalyst has at least 70% or at least 90% reduction in bauxite compounds, sulfur oxides, nitrogen oxides, mercury oxide, and carbon oxides compared to the stack gas flow delivered through the stack to the electrode.

The method and alternative methods of drying and cleaning stack gas may comprise the additional step of passing the gas flow through a venturi positioned downstream of the third flow-through solid catalyst to stabilize the gas flow through the flow-through solid catalysts.

The method and alternative methods of drying and cleaning stack gas may have the stack gas flow sequentially circulated past the pair of electrodes and through the first flow-through solid catalyst, the second flow-through solid catalyst, and the third flow-through solid catalyst to also remove at least 50% or at least 70% of mercury in all forms from the gas flow.

Also disclosed is a fertilizer product produced by the steps of:
(a) passing a stack gas flow selected from the group consisting of volatiles from combustion of coal or from combustion of natural gas or from a cement kiln by a pair of electrodes positioned generally inline in the gas flow with D.C. voltage applied between the electrodes to ionize water vapor, without creating substantial amounts of hydrogen gas, and reduce moisture content of the gas flow below, for example, 8% or 5% of moisture content in the gas flow;
(b) passing the gas flow from the pair of electrode through a first flow-through solid catalyst comprised of calcium zeolite of natural zeolite particles of a majority between 44 µm and 64 µm in size, at a temperature above the dew point between 125° F. and 500° F. and a pressure between 3 psi and 200 psi, adapted to reduce carbon oxides in the stack gases;
(c) passing the gas flow from the first flow-through solid catalyst through a second flow-through solid catalyst comprised of a blend between 25% and 75% of sodium zeolite and calcium zeolite of natural sodium and calcium zeolite particles of a majority between 65 µm and 125 µm in size, at a temperature above the dew point between 125° F. and 500° F. and a pressure between 3 psi and 200 psi, adapted to reduce sulfur oxides in the stack gas flow;
(d) passing the gas flow from the second flow-through solid catalyst through a third flow-through solid catalyst comprised of calcium zeolite of natural zeolite particles of a majority between 78 µm and 204 µm, at a temperature above the dew point between 125° F. and 500° F. and a pressure between 3 psi and 200 psi, to reduce nitrogen oxides in the stack gas flow and providing gas exiting the third solid catalyst with at least 70% reduction in carbon oxides, sulfur oxides, and nitrogen oxides; and
(e) optionally periodically purging residuals from the first flow-through solid catalyst, the second flow-through solid catalyst, and the third flow-through solid catalyst by intermittently passing nitrogen through the solid catalysts to remove residuals collected from the stack gases by the solid catalysts.

Also disclosed is fertilizer product produced by the steps of:
(a) passing a stack gas flow of less than 7% oxygen selected from the group consisting of volatiles from combustion of coal or from combustion of natural gas or from a cement kiln by a pair of electrodes adapted to be positioned generally inline in the gas flow with a voltage applied to the electrodes to ionize water vapor in the gas flow without creating substantial amounts of hydrogen gas and reduce moisture content of the gas flow, for example, below at least 8%;
(b) passing the gas flow from the electrodes through a first flow-through solid catalyst comprised of calcium zeolite of natural zeolite particles at a temperature above the dew point between 125° F. and 500° F. and a pressure between 3 psi and 200 psi adapted to reduce carbon oxides from the stack gases and increase oxygen levels in the stack gas;
(c) passing the gas flow from the first flow-through solid catalyst through a second flow-through solid catalyst comprised of a blend between 25% and 75% of sodium zeolite and calcium zeolite of natural sodium and calcium zeolite particles of at a temperature above the dew point between 125° F. and 500° F. and a pressure between 3 psi and 200 psi adapted to reduce sulfur oxides from the stack gases and increase oxygen levels in the stack gas;
(d) passing the gas flow from the second flow-through solid catalyst through a third flow-through solid catalyst comprised of calcium zeolite of natural zeolite particles at a temperature above the dew point between 125° F. and 500° F. and a pressure between 3 psi and 200 psi adapted to reduce nitrogen oxides in the stack gases and increase oxygen levels in the stack gas flow; and providing gas flow exiting the third flow-through solid catalyst with at least 70% reduction in sulfur oxides, nitrogen oxides and carbon oxides and at least a 15% increase in oxygen content.

Also disclosed is fertilizer product produced by the steps of:
(a) passing a stack gas flow from the group consisting of volatiles from combustion of coal or from combustion of natural gas or from a cement kiln by a pair of electrodes positioned generally inline in the gas flow and applying a D.C. voltage to ionize water vapor without creating substantial amounts of hydrogen gas and reduce moisture content of the gas flow through the flow-through solid catalysts;
(b) passing the gas flow from the pair of electrodes though a first flow-through solid catalyst comprised of natural calcium zeolite with a porosity of a total surface area of not greater than 1200 m²/g adapted to reduce carbon oxides in the stack gas;

(c) passing the gas flow from the first flow-through solid catalyst through a second flow-through solid catalyst comprised of a blend of natural sodium zeolite and natural calcium zeolite with a porosity of a total surface area of not greater than 1200 m²/g adapted to reduce sulfur oxides in the stack gas with the blend of sodium zeolite and calcium zeolite between 25% and 75%;

(d) passing the gas flow from second flow-through solid catalyst through third flow-through solid catalyst comprised of natural calcium zeolite with a porosity of a total surface area not greater than 1200 m2/g adapted to reduce nitrogen oxides in the stack gas and providing gas exiting the third flow-through solid catalyst with at least 70% reduction in sulfur oxides, nitrogen oxides, and carbon oxides; and (e) purging residuals collected from the first flow-through solid catalyst, the second flow-through solid catalyst, and the third flow-through solid catalyst and collecting said residuals purged from the first solid catalyst, the second solid catalyst, and the third solid catalyst to provide a fertilizer product.

Also disclosed is a method of reducing moisture content in a gas flow comprising the steps of:

(a) positioning generally inline a pair of electrodes in a gas flow with moisture content to be reduced to ionize water vapor in the gas flow without creating substantial amounts of hydrogen gas;

(b) providing insulating containment of the gas flow, such as a pipe, from the electrodes; and (c) applying voltage between the electrodes to ionize water vapor in the gas flow to reduce moisture content of the gas flow to at least 8% without creating substantial amounts of hydrogen gas.

In the various embodiments of the method, apparatus or fertilizer product, carbon monoxide (CO), carbon dioxide ($CO_2$), nitrogen oxide ($NO_x$), sulfur dioxide ($SO_2$) and nitrogen dioxide ($NO_2$) in the gas stack flow is reduced. The solid waste may also include nitrate salt formed by reaction of nitrogen and nitrogen compounds retained in the zeolite solid catalysts with available oxygen. Exit from the third flow-through solid catalyst may typically include excess oxygen from the reduction according in the first, second and third flow-through solid catalysts as described above. The apparatus may also include a product purged with liquid nitrogen.

In any case, the exiting stack gas with increased oxygen levels may be returned from the gas cleaning system to the burner where it is combusted with the coal or natural gas. The system may also include a solid waste draw for collecting the materials and drawing the waste material away from the gas cleaning section.

Other details, objects and advantages of the present invention will become apparent from the description of the preferred embodiments described below in reference to the accompanying drawings.

BRIEF DESCRIPTION OF THE DRAWINGS

The invention in various aspects is described in the following description of embodiments and the accompanying drawings which include.

DETAILED DESCRIPTION OF THE DRAWINGS

Figure 1:
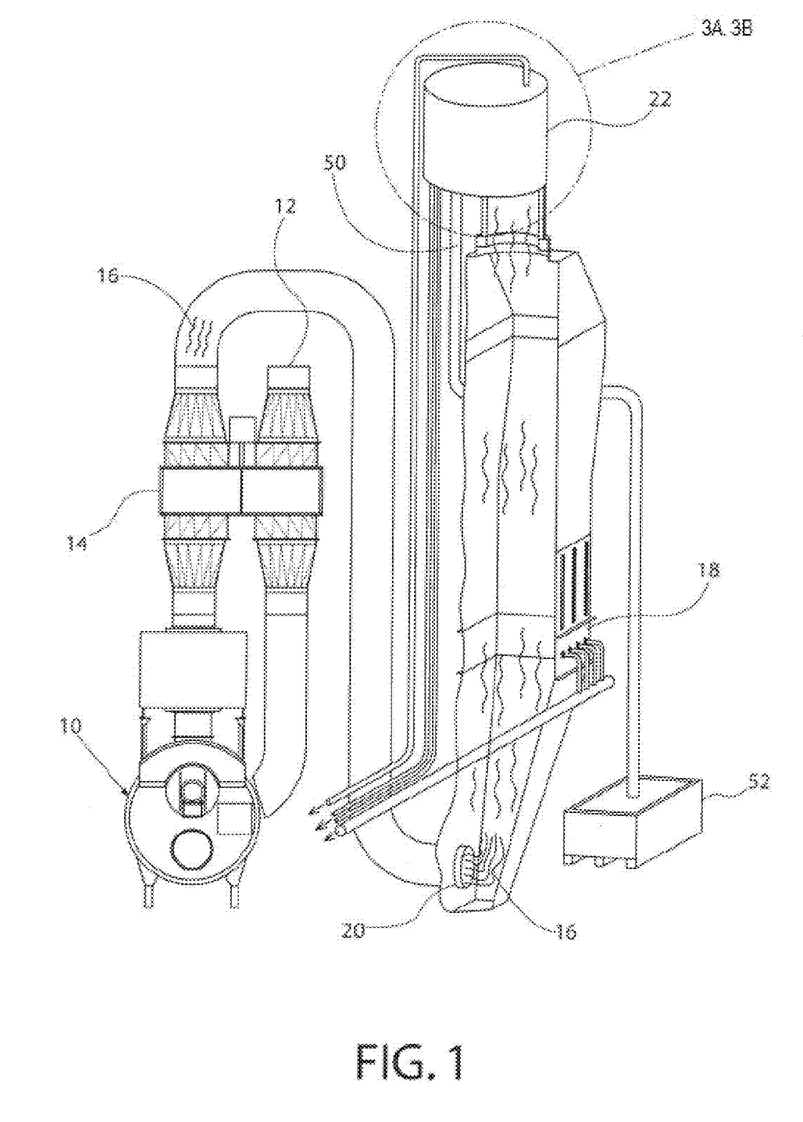
FIG. 1 is a schematic illustrating a coal-fired boiler for electric power generation using stack gases that are cleaned and solid/liquid products recovered in accordance with the present invention.

Referring to FIG. 1 a schematic is shown illustrating a coal-fired boiler for electric power generation producing stack gases that are cleaned and solid/liquid products recovered. A coal fired boiler 10 is shown utilizing the stack gas cleaning and recovery apparatus and method of the present invention. Fresh air intake 12 flows through preheater 14 to supply preheated fresh air to the boiler 10 that is coal fired. The stack gases 16 from boiler 10 pass through preheater 14 whereby heat is transferred to the fresh air intake 12.

The stack gases 16, now processed by preheater 14, are conveyed to an emission control unit where the stack gases 16 are circulated to emission control system 18 through inlet 20 and allowed to rise through the emission control system 18 and up through gas cleaning apparatus 22. The stack gases 16 at this point typically include carbon monoxide, carbon dioxide, sulfur oxides and nitrogen oxides. The stack gases 16 also include water vapor and articulates such as aluminum oxides, mercury compounds and other particulate matters such as uranium and rare earth metals as well as halogens such as fluoride and chloride.

Figure 2A:
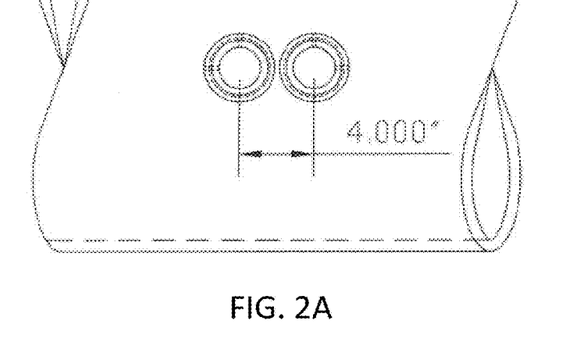
FIGS. 2A, 2B, and 2C fragment parts of the piping for the stack gas cleaning and recovery system shown in FIG. 1 upstream of the portion shown in FIG. 3A or FIG. 3B.
Figure 2B:
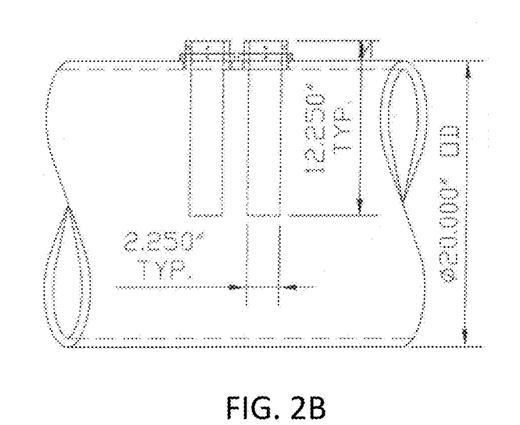
Figure 2C:
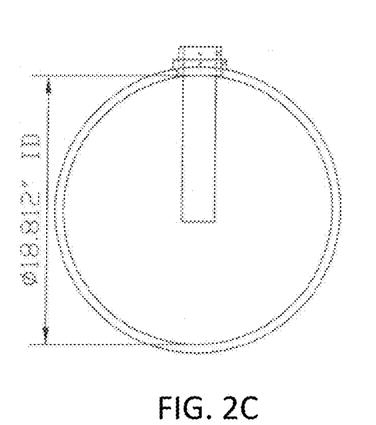

With reference to FIGS. 2A, 2B, and 2C is shown a part of the piping 21 for the stack gas cleaning apparatus 22 shown in FIG. 1 upstream of the portion shown in FIG. 3A or FIG. 3B as described further below. A pair of electrodes 23A and 23B, each preferably commercially available graphite rods, are placed in line piping 21 in the stack gas 16 and are of dimensions that extend into piping 22A sufficient to efficiently ionize the stack gas 16 flowing past the electrodes 23A and 23B. Electrodes 23A and 23B are insulated at 21A from piping 21 to efficiently provide for ionization of stack gas 16. A D.C. voltage is applied between the electrodes 23A and 23B sufficient to form the various ions of $H_2O$ such as HO+, $H_2O$+, H+, 0+ and $0_2$, + (at between 1 and 18.8 volts) while avoiding formation of substantial amounts of $H_2$+ which is produced at higher voltages (e.g., about 34 volts). See "The Ionization of Water Vapor by Electron Impact" Physical Review Vol 43, 116 et seq. (January 1933) The voltage may vary with varying sizes of piping 21 and varying flow rates of stack gas 16. For increases in efficiency of ionization, electrodes 23A and 23B can be increased in size to provide for greater surface area and more than one pair of electrodes in the stack gas flow can be employed. The desire is to provide sufficient ionization to reduce the moisture content of the stack gas 16 flowing through the flow-through solid catalysts 24, 26, and 28, or the flow-through solid catalysts 30, 24, 26 and 28, to below, for example, 8%, or 5% or 3%, or as desired to provide for efficient operation of the flow-through solid catalysts in cleaning the stack gas 16 as described below.

Figure 3A:
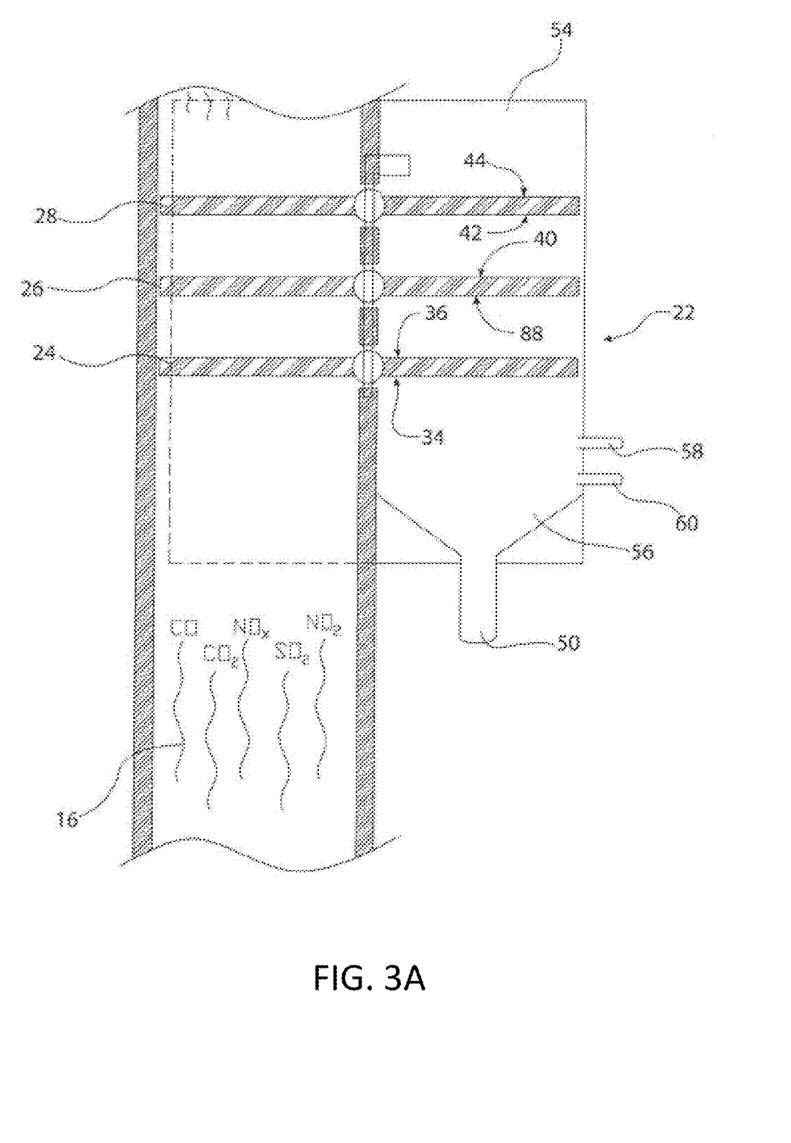
FIG. 3A is an enlarged portion of part of the stack gas cleaning and recovery system shown in FIG. 1 in which three flow-through flow solid catalysts are utilized.
Figure 3B:
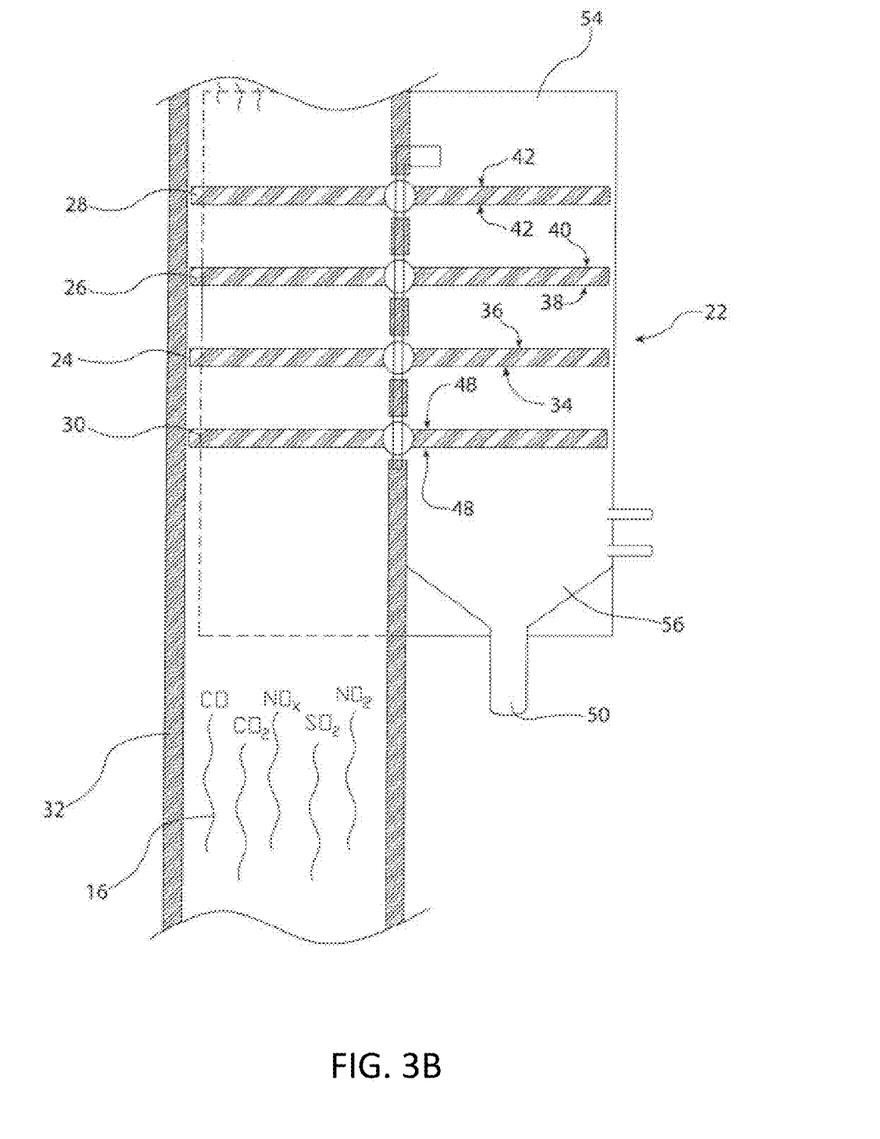
FIG. 3B is an enlarged portion of part of the stack gas cleaning and recovery shown in FIG. 1 in which four flow-through solid catalysts are utilized.
Figure 4:
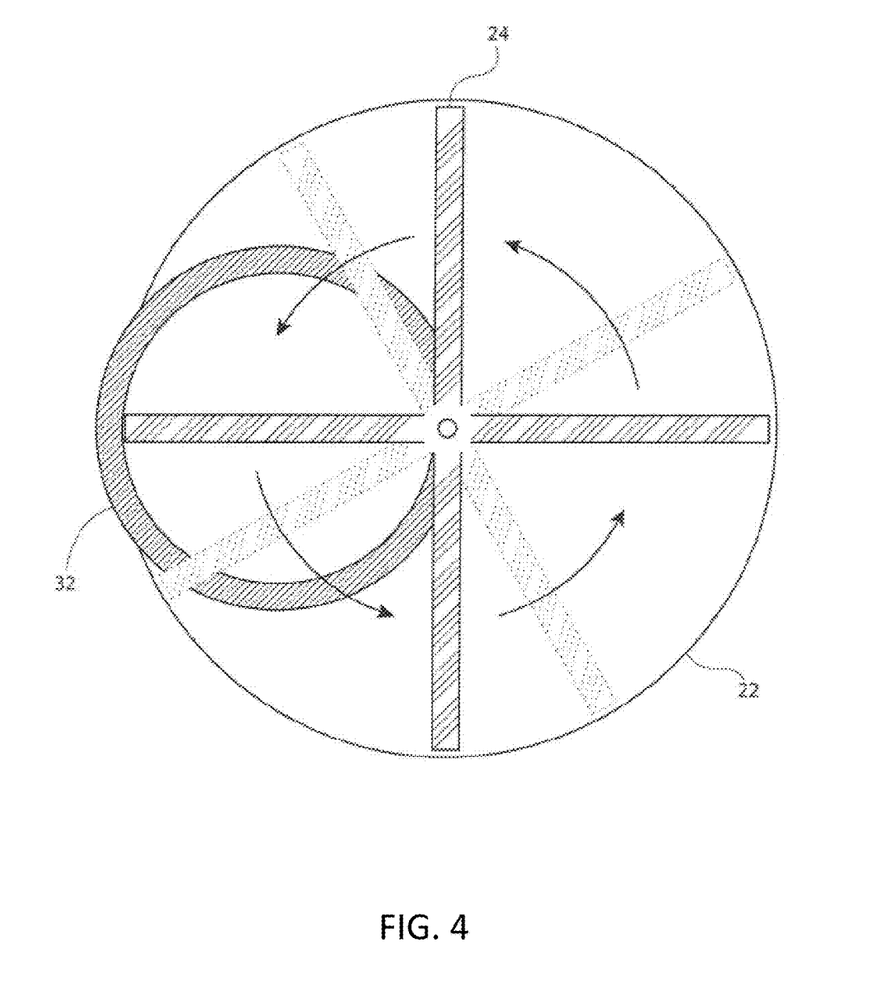
FIG. 4 is a cross-section taken along line 3-3 of FIG. 3A or FIG. 3B.

With reference to FIGS. 3A and 3B, gas cleaning apparatus 22 further comprises first flow-through solid catalyst 24, second flow-through solid catalyst 26 and third flow-through solid catalyst 28 as shown in FIG. 3A, or through fourth flow-through solid catalyst 30, first flow-through solid catalyst 24, second flow-through solid catalyst 26, and third flow-through solid catalyst 28 as shown in FIG. 3B. In FIG. 3A, the rising stack gases 16 in cleaning apparatus 22 first flow through the first flow-through solid catalyst 24, followed by the adjacent second flow-through solid catalyst 26, and then followed by the third flow-through solid catalyst 28. When fourth flow-through solid catalyst 30 is utilized as shown in FIG. 3B, fourth flow-through solid catalyst 30 in stack 32 in gas stack 16 may be positioned after the pair of electrodes 23A and 23B and before the first flow-through solid catalyst 24.

First flow through solid catalyst 24 is comprised of calcium zeolite of natural zeolite particles with a majority between 44 μm and 64 μm in size. "Majority" in the particle size range means here, as well as throughout this application, that it necessarily is 50% or more of the particle sizes in the particle size increment of zeolite to efficiently achieve reduction of carbon oxides in the stack gas. The calcium zeolite is a calcium-sodium-potassium aluminosilicate that is relative high calcium oxide that is available from a natural source. Typical chemical analyses of such calcium zeolite are (i) 2.85% calcium oxide (CaO), 2.85% potassium oxide ($K_2O$), 0.98% manganese oxide (MgO), 0.06% manganese oxide (MnO), 0.19% titanium dioxide ($TiO_2$), 0.05% potassium oxide ($P_2O_5$), 0.03% sodium oxide ($Na_2O$), 11.43% aluminum oxide ($Al_2O_3$), 1.26% ferric oxide ($Fe_2O_3$) 66.35% silicon dioxide ($SiO_2$) and 13.28% LOI; and (ii) 3.4% calcium oxide (CaO), 3.0% potassium oxide ($K_2O$), 1.5% manganese oxide (MgO), 0.05% potassium oxide ($P_2O_5$), 0.3% sodium oxide ($Na_2O$), 12.1% aluminum oxide ($Al_2O_3$), 1.6% ferric oxide ($Fe_2O_3$), 70.0% silicon dioxide ($SiO_2$). A source for calcium zeolite, amongst others, is St. Cloud Mining Company mines at Winston and Truth or Consequences, New Mexico 87901, or a similar mine available in other parts of the world. "Natural zeolite" means here, and elsewhere in this description, zeolite that is mined as opposed to artificially created.

The depth and breadth of the first flow-through solid catalyst 24 is determined by the flow rate of the stack gases 16 and desired pressure drop, and the physical dimensions of the stack 32 through which stack gases 16 are flowing through the gas cleaning apparatus 22.

The primary function of first flow-through solid catalyst 24 is splitting carbon monoxide and carbon dioxide, and retaining carbon in various forms and compounds in the zeolite solid catalyst. First flow-through solid catalyst 24 also captures ash and other particular matter not previously captured, as well as bauxite compound if the fourth flow-through solid catalyst 30 is not provided as shown in FIG. 3A.

The stack gases 16 in cleaning apparatus 22 then flow through second flow-through solid catalyst 26 positioned downstream of the first flow-through solid catalyst 24. Second catalytic flow-through solid catalyst 26 is comprised of a blend between 25% and 75% of sodium zeolite and calcium zeolite with a majority being natural sodium and calcium zeolite particles between 65 μm and 125 μm in size available from a natural source. The source of the calcium zeolite can be the same as that used to provide first catalytic flow-through solid catalyst 24, but comprised of a majority of a particle size between 65 μm and 125 μm. The sodium zeolite may be natural sodium-potassium clinoptilolite that is relatively high in sodium oxide content. Typical chemical analyses of such sodium zeolite are (i) 3.5% sodium oxide ($Na_2O$), 3.8% potassium oxide ($K_2O$), 11.9% aluminum oxide ($Al_2O_3$), 0.7% ferric oxide ($Fe_2O_3$), 0.8% calcium oxide (CaO), 0.4% manganese oxide (MgO), 0.02% manganese oxide (MnO), 0.1% titanium oxide ($TiO_2$) and 69.1% silicon dioxide ($SiO_2$); and (ii) 3.03% sodium oxide ($Na_2O$), 3.59% potassium oxide ($K_2O$), 10.27% aluminum oxide ($Al_2O_3$), 0.86% ferric oxide ($Fe_2O_3$), 1.77% calcium oxide (CaO), 0.00% potassium oxide ($K_2O$), 0.4% manganese oxide (MgO), 0.02% manganese oxide (MnO), 0.11% titanium oxide ($TiO_2$), 69.1% silicon dioxide ($SiO_2$), and 13.09% LOI. A source of the sodium zeolite, amongst others, is the St. Cloud mines in Ash Meadows, Nev., or a similar zeolite mine in another part of the world. Again, the size and depth of the second set of the flow-through solid catalyst is determined by the physical dimensions of the stack 32 and the flow rate and pressure drop through the stack 32 at the gas cleaning apparatus 22.

The primary purpose of the second flow-through solid catalyst 26 is to capture and split sulfur oxides (SOx) in the stack gas 16. The second flow-through solid catalyst 26 is also effective in reducing metal compounds such as mercury, lead, uranium and other trace materials. Again, a lower screen 38 and an upper screen 40 may be provided with mesh sizes between 150 and 250 mesh to maintain the second flow-through solid catalyst 28 while allowing appropriate flow through of stack gas 16.

On exiting the second flow-through solid catalyst 26, the stack gases 16 flow downstream through third flow-through solid catalyst 28. The third flow-through solid catalyst is comprised of calcium zeolite similar in chemical analysis to the first flow-through solid catalyst 24 but with a majority of natural zeolite in the particle size for this solid catalyst between 78 μm and 204 μm.

The third flow-through solid catalyst 28 is provided primarily to split nitrogen oxides present in the stack gas 16. The third flow-through solid catalyst may also reduce other pollutant compounds and ash in the stack gas 16. The composition of natural calcium zeolite in third flow-through solid catalyst 28 may be comprised of the same composition as the first flow through solid catalyst 24, but with different zeolite particle sizes, as described herein, for efficient reduction of nitrogen oxides. Again, a lower screen 42 and an upper screen 44 with mesh size between 150 and 250 mesh is provided to maintain the third flow through solid catalyst 28.

Thus, disclosed FIG. 3A is a method of cleaning stack gases after the stack gas flow passes the pair of electrodes 23A and 23B comprising the steps of:

(a) providing a stack adapted to pass stack gases through a first flow-through solid catalyst 24 comprised of calcium zeolite of natural zeolite particles with a majority of zeolite between 44 μm and 64 μm in size, at a temperature above the dew point between 125° F. and 500° F. and a pressure between 3 psi and 200 psi, adapted to reduce carbon oxides from the stack gases;

(b) providing, in the stack adapted to pass stack gases and positioned downstream of the first flow-through solid catalyst 24, a second flow-through solid catalyst 26 comprised of a blend between 25% and 75% of natural sodium zeolite and natural calcium zeolite of zeolite particles with a majority zeolite between 65 μm and 125 µm in size, at a temperature above the dew point between 125° F. and 500° F. and a pressure between 3 psi and 200 psi, adapted to reduce sulfur oxides from the stack gases;

(c) providing, in the stack adapted to pass stack gases and positioned downstream of the second flow-through solid catalyst 26, a third flow-through solid catalyst 28 comprised of natural calcium zeolite of zeolite particles with a majority of zeolite between 78 µm and 204 µm, at a temperature above the dew point between 125° F. and 500° F. and a pressure between 3 psi and 200 psi, adapted to reduce nitrogen oxides in the stack gases; and (d) passing stack gases, selected from the group consisting of volatiles from combustion of coal or from combustion of natural gas or from a cement kiln, sequentially past the electrodes and through the first flow-through solid catalyst 24, the second flow-through solid catalyst 26, and the third flow-through solid catalyst 28, each flow-through solid catalyst collecting residuals in the solid catalysts and providing gas exiting the third solid catalyst with at least 70% reduction in carbon oxides, sulfur oxides, and nitrogen oxides.

The method may also sequentially circulate the stack gas flow past the same or a different pair of electrodes and through the first flow-through solid catalyst 24, the second flow-through solid catalyst 26, and the third flow-through solid catalyst 28 to remove from the stack gas at least 50% or 70% of mercury in all forms, namely, elemental and oxidized forms.

Alternatively disclosed in FIG. 3A is a method of drying and cleaning stack gases comprising the steps of:

(a) providing a stack gas flow of less than 7% oxygen in containment past generally inline electrodes with a voltage applied to the electrodes to ionize water vapor in the stack gas flow and reduced moisture content in the stack gas flow;

(b) providing in a stack adapted to pass stack gases of less than 7% oxygen passing the pair of electrodes through a first flow-through solid catalyst 24 comprised of natural calcium zeolite of natural zeolite particles at a temperature above the dew point between 125° F. and 500° F. and a pressure between 3 psi and 200 psi adapted to reduce carbon oxides from the stack gases and increase oxygen levels in the stack gases;

(c) providing, in the stack adapted to pass stack gases and positioned downstream of the first flow-through solid catalyst 24, a second flow-through solid catalyst 26 comprised of a blend between 25% and 75% of sodium zeolite and calcium zeolite of natural zeolite particles at a temperature above the dew point between 125° F. and 500° F. and a pressure between 3 psi and 200 psi adapted to reduce sulfur oxides from the stack gas and increase oxygen levels in the stack gases;

(d) providing, in the stack adapted to pass stack gas positioned downstream of the second flow-through solid catalyst 26, a third flow-through solid catalyst 28 comprised of calcium zeolite of natural zeolite particles at a temperature above the dew point between 125° F. and 500° F. and a pressure between 3 psi and 200 psi adapted to reduce nitrogen oxides in the stack gases and increase oxygen levels in the stack gases; and (e) passing stack gases of less than 7% oxygen, selected from the group consisting of volatiles from combustion of coal or from combustion of natural gas or from a cement kiln, sequentially past the pair of electrodes and through the first flow-through solid catalyst 24, the second flow-through solid catalyst 26, and the third flow-through solid catalyst 28 collecting residuals in the solid catalysts and providing gas exiting the third flow-through solid catalyst with at least 70% reduction in sulfur oxides, nitrogen oxides and carbon oxide and at least 15% increase oxygen content.

The invention is operative as evidenced by substantial increase in oxygen exiting the third flow-through solid catalyst 28 compared to the oxygen levels in the stack gas entering the first flow-through solid catalyst 24. The paper by Yoshitaka Toda et al., titled *"Activation And Splitting of Carbon Dioxide on The Surface Of An Inorganic Electrode Material"* (Published 31 Jul. 2013) suggests a potential mechanism, namely, splitting off oxygen from $CO_2$, leaving CO to then be reduced. One mechanism to accomplish $CO_2$ splitting is electrophoresis disassociation of oxygen in the presence of the zeolite flow-through solid catalyst into various forms of carbon and oxygen, including oxygen radicals such as the superoxide $O_2-$ anion. Metal clusters formed in the process in the presence of the zeolite catalyst may also provide additional catalytic activity resulting in $CO_2$ splitting.

Also, the nitrogen from the stack gas is in large part retained in the zeolite flow-through solid catalysts, and is available for reaction with available oxygen present particularly during purging as described below.

Where a fourth flow through solid catalyst 30 is provided as shown in FIG. 3B, the fourth flow-through solid catalyst is provided in the stack gas 16 after passing the pair of electrodes and before the first flow-through solid catalyst 24. The gas stream 16 may flow through the fourth flow-through solid catalyst 30 before flowing into the first flow-through solid catalyst 24. The composition of the fourth flow-through solid catalyst 30 is comprised of the same composition as the first flow-through solid catalyst, namely, comprised of calcium zeolite, but with a majority of the natural zeolite being particles between 44 µm and 64 µm in size. An electrical charge is also provided on the fourth flow-through solid catalyst 30 attracts and retains bauxite particles from stack gas 16. As a result the fourth flow-through solid catalyst 30 comprised of calcium zeolite of natural zeolite particles between 44 µm and 64 µm in size positioned in the stack before the first flow-through solid catalyst 24 with an electrical charge on said fourth flow-through solid catalyst 30 to efficiently collect bauxite compounds from the stack gases before passing through the first flow-through solid catalyst.

Where the fourth flow-through catalytic solid catalyst 30 is provided as shown in FIG. 3B, aluminum oxide may be largely separately collected and separately processed to be recovered, as explained further herein. The stack gas 16 flowing through gas cleaning apparatus 22 is separately cleaned of bauxite compounds as well as cleaned as described above of carbon dioxide, carbon monoxide, nitrogen oxides, sulfur oxides as well as mercury oxides, water vapor and other trace metals in the stack gas 16. The cleaning of the stack gases 16 flowing through first flow-through solid catalyst 24, second flow-through solid catalyst 26, third flow-through solid catalyst 28, and if present also fourth flow-through solid catalyst 30, provides at least 90%, 95%, or even 99% reduction in bauxite compounds, carbon oxides, sulfur oxides, nitrogen oxides, and mercury oxides from the stack gases 16.

Alternatively, a method of drying and cleaning stack gases may involve putting all of the zeolite flow-through solid catalysts in to all three or four of the flow-through solid catalysts. Therefore the method may comprising the steps of:

(a) passing a contained stack gas flow, selected from the group consisting of volatiles from combustion of coal or from combustion of natural gas or from a cement kiln, past a pair of electrodes positioned generally inline in the gas flow and applying D.C. voltage between the electrodes to ionize water vapor without creating substantial amounts of hydrogen gas and reduce moisture content of the gas flow through the flow-through solid catalysts;

(b) passing stack gas flow from the pair of electrodes through a flow-through solid catalyst comprised of a mixture of calcium zeolite of natural zeolite particles of a majority between 44 μm and 64 μm in size, a blend between 25% and 75% of sodium zeolite and calcium zeolite of natural sodium and calcium zeolite particles of a majority between 65 μm and 125 μm in size, and calcium zeolite of natural zeolite particles of a majority between 78 μm and 204 μm at a temperature above the dew point between 125° F. and 500° F. and a pressure between 3 psi and 200 psi adapted to reduce carbon oxides in the stack gas flow, the mixture having a porosity of a total surface area not greater than 1200 m$^2$/g; and (c) operating the stack gas flow sequentially past the pair of electrodes and through the flow-through solid catalyst to provide at least 70% reduction in sulfur oxides, nitrogen oxides and carbon oxide.

Again, the size of the pair of electrodes may be varied to provide the surface area to the desired moisture content in the stack gas flow, depending on the desired moisture content desired in the stack gas, for processing to reduce the levels of carbon oxides, sulfur oxides and nitrogen oxides, and the flow through volume of stack gas to be processed.

Figure 5:
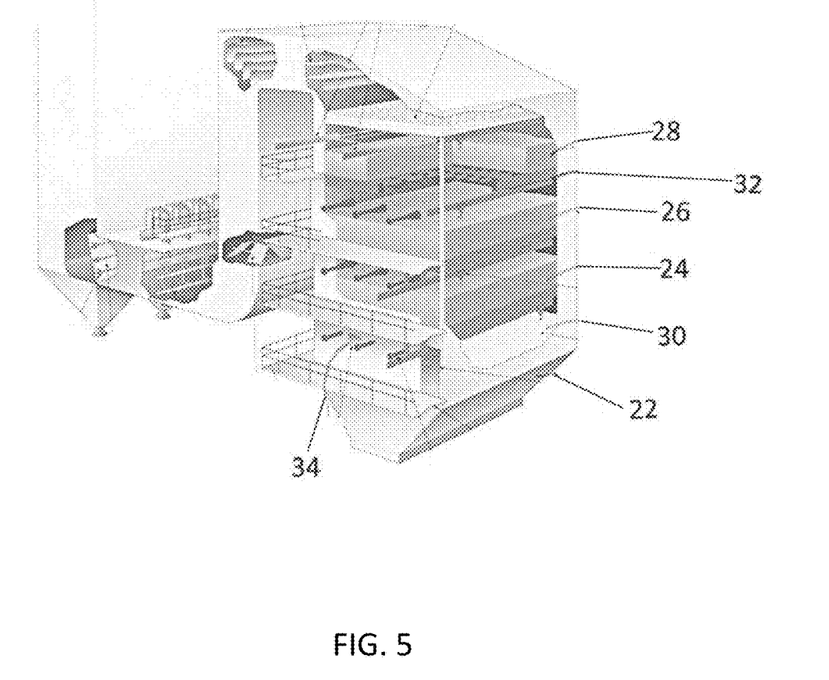
FIG. 5 is a cut away view of a flow-through housing receiving a stack gas flow through a duct at the bottom and containing racks of flow-through solid catalyst for cleaning the stack gas and recovering solids and liquids in accordance with the invention.
Figure 6:
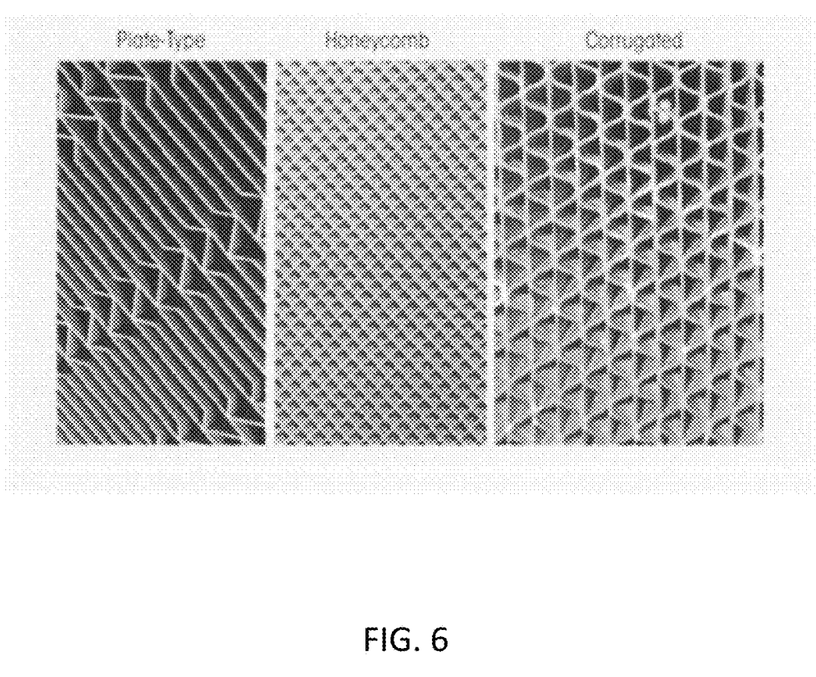
FIG. 6 shows three types of flow-through solid catalyst with different substrates in accordance with the present invention.

As shown in FIGS. 5 and 6, the flow-through solid catalyst may be implemented by applying one of a zeolite material of the particle size describe (in reference to FIG. 3A or 3B) to a solid substrate of a metal such a stainless steel, titanium or aluminum or ceramic such as cordierite, mullite, or alumina. It should be noted that the gas flows through the flow-through solid catalyst and interacts with the zeolite material on surface portions of the substrate.

The solid substrate may be formed of flat plates, corrugated plates, or honeycomb blocks as shown in FIGS. 5 and 6. However, a titanium plate or a metal substrate alloyed with titanium or titanium alloy is believed particularly desirable for the substrate. The spacing between plates or in the honey comb is selected by the flow-through capacity of the embodiment and the pressure drop across the system as well as the efficiency and effectiveness of removal of $CO_2$, $CO$, $SO_x$, or $NO_x$ by the particular embodiment. Once the metal or ceramic substrate has been coated with the described zeolite catalyst, the flat or corrugated metal plate are physically positioned in parallel rows spaced 1 mm to 6 mm apart to form a 'radiator' type structure. These parallel coated plates are then physically positioned into block structures which can be 1 cubic foot (300 mm×300 mm×300 mm) in size. Typically, the spacing is determined primarily by the desired pressure drop in the particular embodiment.

In any case, the zeolite material of the desired particle size for the flow-through solid catalyst may be chemically or physically attached to the metal or ceramic substrate. Chemical bonding methods may be by 'wash coating' techniques where the described zeolite fine material are placed in an aqueous suspension with a binder and the zeolite suspension is then washed over the metal or ceramic substrate, leaving a zeolite coating on the surface of the substrate. This 'wash coated' solid catalyst with the zeolite coating may then be calcined or heat treated to remove the moisture and produce a relatively dry flow-through solid catalyst of a metal or ceramic substrate coated with a dry zeolite particulate coating. Physical coating/bonding techniques may be by plasma arc powder coating methods where the desired zeolite fine powdered catalyst is fed through a plasma arc to cause a fusion of the zeolite particles to the metal or ceramic substrate to produce the flow-through solid catalyst as described in in FIG. 3A or 3B.

In order to accelerate interaction of $CO_2$, $CO$, $SO_x$, or $NO_x$ with the zeolite surface chemistry to increase the efficiency of removal of the chemical species in the stack gas, trace metals are doped or added into the zeolite catalyst molecular exterior and interior surface. Some of the trace metals added to the zeolite chemical structure for this purpose include copper, nickel, titanium, zinc, iron, and/or cobalt. Besides the trace metals listed above, other trace metals can also be added to the zeolite chemical structure to improve the rate and effectiveness of $CO_2$, $CO$, $SO_x$, and $NO_x$ as stack gas passes through flow-through solid catalyst with the zeolite particles bonded to substrate surface. The chemical method of doping trace metals onto zeolite surfaces may be a wash coating method followed by a calcination heat treatment step. Other techniques such as plasma arc methods are also utilized.

In any event, these flow-through solid catalysts in blocks in the formed as plates, honeycombs or corrugations (as shown in FIG. 6) are then placed in racks 24', 26' and 28' or racks 24', 26', 28' and 30' as shown in FIG. 5. These racks are supported on rails 32 so that racks can be placed and removed from flow-through housing 22' through doors 34. The flow-through solid catalysts in racks 24', 26', and 28' or racks 24', 26', 28' and 30' may be with different zeolite particle sizes as explained above with reference in FIG. 3A or 3B to focused on $CO_x$, $SO_x$ or $NO_x$, or may all be mixtures of the described particle sizes as explained above. In any event, the flow-through solid catalyst in blocks is positioned in housing 22' for the stack gas flow from the coal fired power plant, or other facility, upwardly through the stack as shown in FIG. 5.

In this way, the stack gas from a power plant can be processed to reduce $CO_2$, $CO$, $SO_x$, and $NO_x$ present in the stack gas flow, and with the separate collection of aluminum oxides if performed as shown FIG. 3B. Note that while described with reference to a coal fire power plant, the same or similar stack apparatus and method may be to reduce $CO_2$, $CO$, $SO_x$, and $NO_x$ present in the stack gas flow from a gas fired power plant, a cement plant or any other combustion system (including vehicle exhaust) producing these stack gas pollutants.

It is expected that carbon dioxide in the stack gas 16 may be reduced by at least 95% by the stack gas from coal-fired plant entering cleaning apparatus 22; sulfur dioxide in the stack gas 16 may be reduced by at least 95% from the simulated stack gas entering the cleaning apparatus 22; and nitrogen oxide in the stack gas 16 may be reduced by 95% or more by the stack gas entering cleaning apparatus 22. These results would provide a highly effective cleaning apparatus 22 in cleaning stack gas from a coal-fired power plant.

While the invention has been described with solid catalyst in reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope.

Therefore, it is intended that the invention not be limited to the particular embodiments disclosed, but that the invention will include all embodiments falling within the scope of the appended claims.

What is claimed is:

1. An apparatus for drying and cleaning stack gases from a fossil fuel source, the apparatus comprising:
a plurality of flow-through solid catalysts, each of the plurality of flow-through solid catalysts comprising:
a zeolite material with a porosity of a total surface area of not greater than 1200m$^2$/g and effective for achieving at least 70% reduction in carbon oxides, sulfur oxides, or nitrogen oxides from the stack gases;
a solid substrate comprising metal or ceramic components to which the zeolite material has been applied to create a zeolite-coated solid substrate, the components being separated by spacing through which the stack gases flow; and
the spacing between the components of the solid substrate being selected based on a flow-through capacity of, a pressure drop across, and an effectiveness of removal of carbon oxides, sulfur oxides, or nitrogen oxides by the flow-through solid catalyst; and a pair of electrodes positioned inline in a gas flow upstream of the plurality of flow-through solid catalysts, the electrodes being insulated from containment of the gas flow, with a DC voltage applied between the electrodes to ionize water vapor in the gas flow without creating substantial amounts of hydrogen gas and to reduce moisture content of the gas flow through the flow-through solid catalysts.

2. The apparatus of claim 1, the DC voltage applied between the electrodes being less than 34 volts.

3. The apparatus of claim 1, the solid substrate comprising a material selected from a group consisting of stainless steel, copper, titanium, a titanium alloy, aluminum, cordierite, mullite, and alumina.

4. The apparatus of claim 1, each of the plurality of flow-through solid catalysts further comprising a binder to increase adherence of the zeolite material to the substrate.

5. The apparatus of claim 1, each of the flow-through solid catalysts further comprising a trace metal that has been doped into the zeolite-coated solid substrate.

6. The apparatus of claim 5, the trace metal being selected from a group consisting of copper, nickel, titanium, zinc, iron, and cobalt.

7. The apparatus of claim 1, the components of the solid substrate being flat or corrugated plates positioned in parallel rows spaced between 1 mm and 6 mm apart.

8. The apparatus of claim 7, the parallel plates being positioned into substantially a cubic block structure that is about a cubic foot in size.

9. The apparatus of claim 1, the components of the solid substrate being selected from a group consisting of flat plates, corrugated plates, and honeycomb blocks.

10. The apparatus of claim 1, further comprising:
a housing;
a plurality of racks, each one of the plurality of flow-through solid catalysts being placed in one of the plurality of racks;
a plurality of rails, each one of the plurality of racks being supported on one or more of the plurality of rails so that it can be inserted into and removed from the housing.

11. The apparatus of claim 1,
the zeolite material of at least a first one of the plurality flow-through solid catalysts being adapted to reduce carbon oxides from the stack gases;
the zeolite material of at least a second one of the plurality flow-through solid catalysts being adapted to reduce sulfur oxides from the stack gases; and
the zeolite material of at least a third one of the plurality flow-through solid catalysts being adapted to reduce nitrogen oxides from the stack gases.

12. The apparatus of claim 1, the zeolite material of at least one of the plurality of flow-through solid catalysts comprising a mixture of first, second and third zeolite materials, the first zeolite material being adapted to reduce carbon oxides from the stack gases, the second zeolite material being adapted to reduce sulfur oxides from the stack gases, and the third zeolite material being adapted to reduce nitrogen oxides from the stack gases.

13. A method of making the apparatus of claim 1, the method comprising making each of the plurality of flow-through solid catalysts by steps comprising:
providing the solid substrate comprising metal or ceramic components;
coating the solid substrate with the zeolite material to create the zeolite-coated solid substrate; and
spacing the components of the solid substrate based on the flow-through capacity of, the pressure drop across, and the effectiveness of removal of carbon oxides, sulfur oxides, or nitrogen oxides by the flow-through solid catalyst.

14. The method of claim 13, the coating step comprising:
placing the zeolite material in an aqueous suspension with a binder to create a zeolite suspension;
washing the zeolite suspension over the solid substrate, leaving a zeolite coating on a surface of the solid substrate; and
heat-treating the zeolite-coated solid substrate to remove moisture.

15. The method of claim 13, wherein the coating step is accomplished by a technique selected from a group consisting of dip coating and plasma arc powder coating.

16. The method of claim 13, further comprising doping a trace metal into the zeolite-coated solid substrate.

17. The method of claim 16, the doping step comprising:
placing the trace metal in an aqueous suspension with a binder to create a trace metal suspension;
washing the trace metal suspension over the zeolite-coated solid substrate to create a doped solid substrate; and
heat-treating the doped solid substrate to remove moisture.

18. The method of claim 16, wherein the doping step is accomplished by plasma arc powder coating.

* * * * *